A. CRUME.
BEET HARVESTER.
APPLICATION FILED JAN. 25, 1910.
1,001,360.
Patented Aug. 22, 1911.
2 SHEETS—SHEET 1.
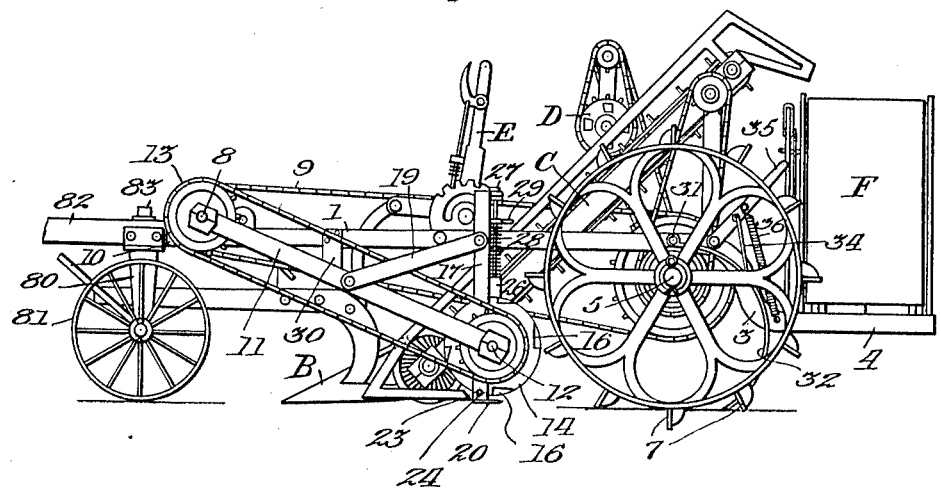
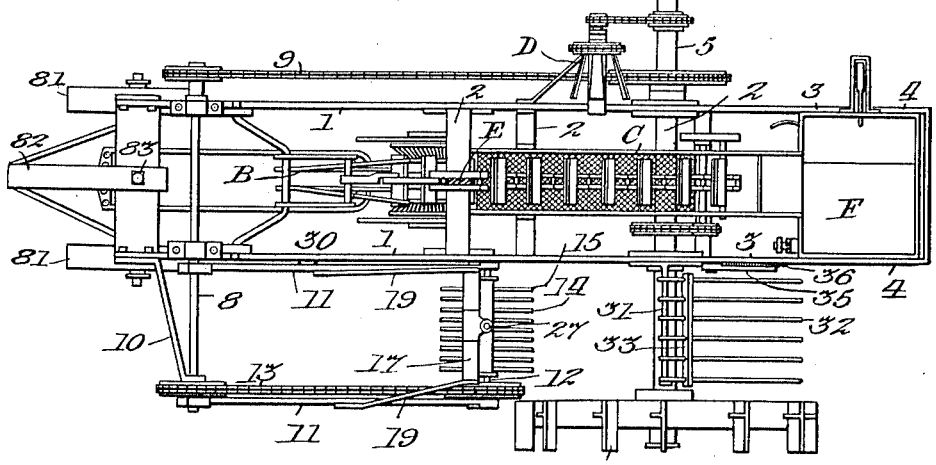
Inventor
Albert Crume
Witnesses
Phil E. Barnes
Wm. Bagger
By Victor J. Evans
Attorney A. CRUME.
BEET HARVESTER.
APPLICATION FILED JAN. 25, 1910.
1,001,360.
Patented Aug. 22, 1911.
2 SHEETS—SHEET 2.
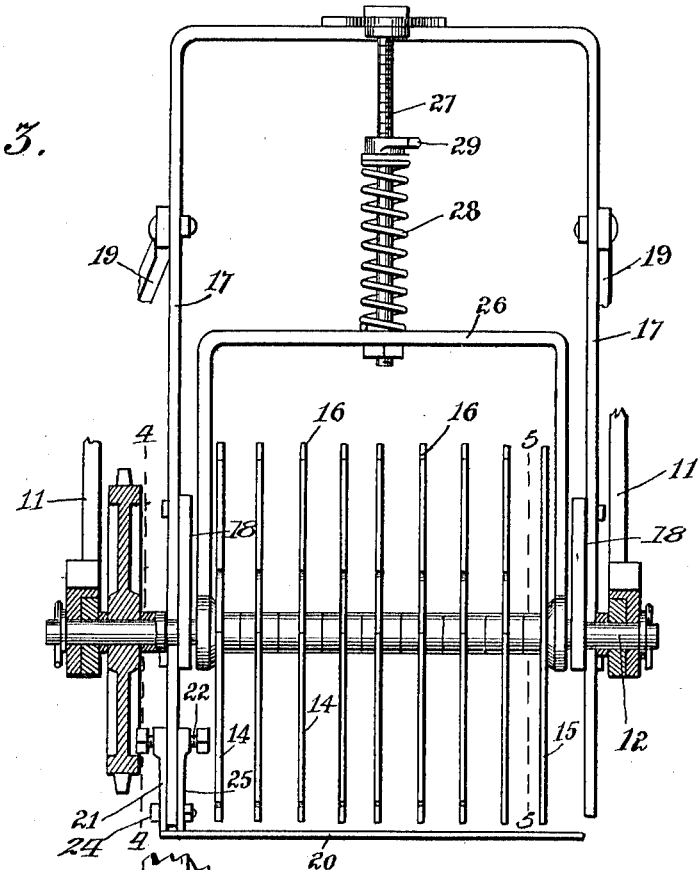
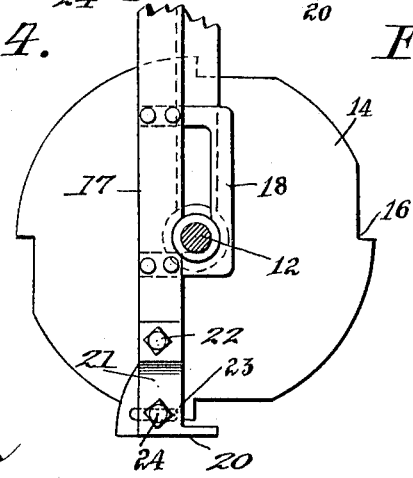
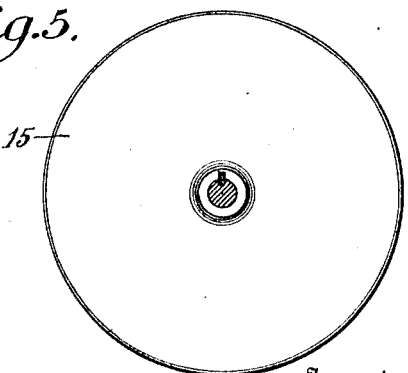
Witnesses
Phil E. Barnes
Wm. Bagger
Inventor
Albert Crume
By Victor J. Evans
Attorney

UNITED STATES PATENT OFFICE.

ALBERT CRUME, OF BRUSH, COLORADO, ASSIGNOR TO THE BRUSH DEVELOPMENT COMPANY, OF BRUSH, COLORADO, A CORPORATION OF COLORADO.

BEET-HARVESTER.

1,001,360.  Specification of Letters Patent.  Patented Aug. 22, 1911.

Application filed January 25, 1910. Serial No. 539,982.

*To all whom it may concern:*

Be it known that I, ALBERT CRUME, a citizen of the United States of America, residing at Brush, in the county of Morgan and State of Colorado, have invented new and useful Improvements in Beet-Harvesters, of which the following is a specification.

This invention relates to beet harvesters, and it has particular reference to new and improved means associated with a beet harvester for the purpose of removing the tops from the beets as they grow in the field, to chop said tops, and subsequently to bunch the same in order to enable the beet roots to be subsequently conveniently lifted from the ground by the harvesting mechanism proper.

A special object of the invention is to provide a top removing and chopping mechanism of simple and improved construction which during the progress of the machine, while one row of beets is being lifted from the ground, elevated and dumped into a receptacle, will remove and chop the tops from another row, said mechanism being constructed to operate efficiently upon beets of all sizes.

Further objects of the invention are to simplify and improve the general construction and operation of the component parts of a machine as outlined above.

With these and other ends in view, which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings, Figure 1 is a side elevation showing an organized machine constructed in accordance with the invention. Fig. 2 is a top plan view, the adjusting lever for the lifter being shown in section. Fig. 3 is a detail view in sectional elevation of the topping mechanism. Fig. 4 is a sectional detail view taken on the line 4—4 in Fig. 3. Fig. 5 is a sectional detail view taken on the line 5—5 in Fig. 3.

Corresponding parts in the several figures are denoted by like characters of reference.

The main frame of the improved machine is composed of the side bars 1, 1 which are connected and spaced apart at suitable intervals by braces 2, 2, said side bars being provided adjacent to their rear ends with downwardly offset portions 3 and rearward extensions 4. The main frame supports the beet lifter B, the carrier or elevator C and the trimming device D, together with adjusting and actuating means for said parts, including the lifter adjusting lever E; all of which parts may be of any suitable or conventional construction; these parts, while indicated in the drawings, have been shown merely in outline, as the detailed construction is not herein claimed. The frame also supports the receptacle F in which the beets may be delivered by the carrier or elevator until a sufficient quantity has been accumulated, when the contents of the receptacle may be dumped upon the ground. The rear axle 5, which is arranged directly in front of the downwardly offset portions 3, is equipped with the transporting wheels 6; said wheels being formed with relatively narrow tires having earth-engaging grouts 7 of relatively great width in order that sufficient power may be developed to drive the moving parts of the mechanism of the machine with less danger of becoming entangled with the tops of the beets, than would be the case if wide tires were employed. The wheels are to be equipped with what is generally known as mowing machine hubs to enable the machine to be conveniently turned without interfering with the operation. It will also be understood that the wheels are to be suitably spaced apart to enable them to travel between the rows of beets, it being designed that the machine shall straddle three rows, one of which will be topped, the second lifted, while the third straddled row represents that from which the beets have been lifted by a previous operation.

The side bars of the frame are provided adjacent to the front ends with bearings for a shaft 8 to which motion is transmitted by a chain or link belt 9 from the axle 5; the shaft 8 has an additional bearing in a brace 10 which extends laterally from the frame of the machine, and said shaft carries adjacent to one side of the main frame an auxiliary frame 11 which will be designated as the chopper frame and which affords bearings for a shaft 12 which will be known as the chopper shaft. The shaft 12 is driven by a chain or link belt 13 from the shaft 8, and said shaft carries a plurality of suitably spaced disks 14 and 15, all of which are of the same diameter, but the disks 14 are provided at their edges with notches 16 forming cutting teeth, while the disk or disks 15, of which one or more may be used, are non-mutilated.

A cutter-carrying frame 17 which normally occupies an approximately vertical position is provided with keepers or bridles 18 engaging the shaft 12 with which the frame 17 is thus connected in such a manner as to be capable of vertical movement relatively to said shaft; the frame 17 is also connected with the chopper frame 11 by means of links 19. One of the limbs or side members of the frame 17, which latter is in the form of a yoke, carries at its lower end a horizontally disposed knife or cutter 20 having at one end an upturned lug 21 for the passage of a pivotal member 22; said lug being also provided with a slot 23 for the passage of an adjusting bolt 24, enabling the knife to be slightly tilted, as will be readily understood; the attachment of the knife to the carrying frame is reinforced by a plate or washer member 25. A yoke or stirrup 26 which is pivotally mounted upon the shaft 12 is connected with the upper end of the frame 17 by means of a bolt 27 upon which said stirrup may slide upwardly against the tension of a spring 28 which is coiled upon said bolt and which bears at its upper end against a nut 29, whereby the tension may be adjusted.

In practice, the cutting blade 20 will be spaced about one-half inch below the disks 14 and 15, and a stop may be provided in the nature of an arm extending from and adjustably connected with one of the frame bars 1 in the path of the chopper frame 11 to limit the movement of the latter in a downward direction, as shown at 30. When in the progress of the machine a beet is reached, the disks 14 and 15 will ride upwardly upon the same, carrying the knife or cutting blade 20 in an upward direction to properly place the same; the connection between the disks 14, 15 and the blade 20 being resilient, as herein described, to compensate for beets of different sizes. The notched blades 14 will serve to chop or shred the beet top which is meanwhile by the action of the notched disks being forced toward the edge of the knife 20, whereby the top is bodily severed from the beet, the shredded leaves being left behind. Should the knife 20 by the stress of the operation be sprung in an upward direction, it will be intercepted by the non-mutilated disk or disks 15 and will thus be kept out of the range of the notches in the disks 14, thereby avoiding injury to this part of the machine.

A shaft 31 extending laterally from the main frame in rear of the top-severing and chopping mechanism serves to support the rake which comprises a series of curved resilient teeth 32 which are suitably connected together by a head or cross bar 33. The rake is connected by a link 34 with an operating lever 35 which latter is fulcrumed upon the main frame and is connected to the latter by a tension spring 36, whereby the rake teeth are held in position. The rake serves to gather the chopped beet tops in bunches which may be delivered at suitable intervals, or discharged upon the ground by manipulating the lever 35 against the tension of the spring. The rake lever may be operated manually by the operator, but when desired means may be provided for actuating the said lever automatically at suitable predetermined intervals.

The operation and advantages of this invention will be readily understood from the foregoing description taken in connection with the drawings hereto annexed by those skilled in the art to which it appertains.

The general construction of the machine is simple, and the parts are few and ont intricate, and it follows that the moving parts of the machine may be driven with small expenditure of power. In the use of the machine it is obvious that two rows are simultaneously operated upon, the tops of one row being removed, chopped or shredded and bunched, while in the second row the beets from which the tops have been previously removed are lifted, cleaned and conveyed to the dumping receptacle. The forward end of the main frame is to be supported upon a suitable carrying truck 80 having wheels 81 and a draft tongue 82, said truck being connected to the frame by a king bolt 83 enabling the machine to be conveniently turned.

Having thus described the invention, what is claimed as new, is:—

1. In a machine of the class described, a pivotally supported chopper frame, a shaft supported for rotation by said frame, an auxiliary frame having keepers engaging the shaft, links connecting the auxiliary frame with the chopper frame, a blade carried by the auxiliary frame, chopping disks upon the shaft, and spring means for forcing the disk-carrying shaft downwardly with reference to the keepers upon the auxiliary frame.

2. In a machine of the character described, a pivotally supported chopper frame, a shaft supported for rotation by said frame, chopping disks upon the shaft, an auxiliary frame having keepers engaging the disk-carrying shaft, a topping blade connected adjustably with the auxiliary frame and spaced from the lower edges of the disks, links connecting the auxiliary frame with the chopper frame, a stirrup connected with the disk-carrying shaft, a bolt member connected with the auxiliary frame and slidably engaging the stirrup, a spring coiled upon the bolt and engaging the stirrup to force the latter and the disk-carrying shaft in the direction of the topping blade, and a nut to regulate the tension of the spring.

3. In a machine of the character described, a main frame, a pivotally supported chopper frame, a driven shaft supported by said frame, a plurality of chopping disks upon said shaft, an auxiliary frame connected with the chopper frame and having keepers slidably engaging the shaft, and a chopping blade adjustably connected with the auxiliary frame.

4. In a machine of the character described, means for removing the tops and for chopping the same, including a plurality of chopping disks mounted upon a shaft which is supported for rotation, and a topping blade supported in approximately parallel relation to the axis of the disk-carrying shaft.

5. In a machine of the character described, means for removing the tops and for chopping the leaves including a plurality of chopping disks mounted upon a shaft, a yieldingly supported blade supporting said shaft for rotation, and a topping blade supported yieldingly and resiliently with reference to the disk-carrying shaft, and positioned in approximately parallel relation to the axis of said shaft.

In testimony whereof I affix my signature in presence of two witnesses.

ALBERT CRUME.

Witnesses:
LEOPOLD BERTRAND,
QUIMBY A. WOODWARD.

---

Copies of this patent may be obtained for five cents each, by addressing the "Commissioner of Patents, Washington, D. C."